United States Patent [19]

Patton, Jr.

[11] E Patent Number: Re. 32,566

[45] Reissued Date of Patent: Dec. 29, 1987

[54] BOWLER'S GLOVE AND WRIST SUPPORT

[76] Inventor: Edward E. Patton, Jr., 5080 Fremont St., Jacksonville, Fla. 32210

[21] Appl. No.: 637,119

[22] Filed: Aug. 2, 1984

Related U.S. Patent Documents

Reissue of:

[64] Patent No.: 4,190,906
Issued: Mar. 4, 1980
Appl. No.: 883,223
Filed: Mar. 3, 1978

[51] Int. Cl.[4] ..... A41D 19/00

[52] U.S. Cl. ..... 2/161 A; 2/170; 2/20; 273/54 B

[58] Field of Search ..... 2/16, 20, 161 R, 161 A, 2/170, 162; 273/54 B, 189 A; 128/77, 87 R, 89 R, 165

[56] References Cited

U.S. PATENT DOCUMENTS

| | | | |
|---|---|---|---|
| 1,469,315 | 10/1923 | Hansard | 273/189 A |
| 2,794,638 | 6/1957 | Risher et al. | 273/54 |
| 3,049,717 | 8/1962 | Meyer | 2/16 |
| 3,327,703 | 6/1967 | Gamm | 128/77 |
| 3,421,160 | 1/1969 | Domenico | 273/54 B X |
| 3,436,075 | 4/1969 | Robinson | 273/26 |
| 3,512,776 | 5/1970 | Thomas, Sr. | 273/54 |
| 3,533,407 | 10/1970 | Smith | 128/165 |
| 3,583,704 | 6/1971 | Callanan | 2/161 A X |
| 3,728,738 | 4/1973 | Andolino | 2/161 A |
| 3,779,550 | 12/1973 | Benoun et al. | 273/54 |
| 3,790,168 | 2/1974 | Hashimoto | 2/161 A X |
| 4,047,250 | 9/1977 | Norman | 2/170 X |
| 4,138,108 | 2/1979 | Robinson | 273/54 |

*Primary Examiner*—Werner H. Schroeder
*Assistant Examiner*—J. L. Olds
*Attorney, Agent, or Firm*—Arthur G. Yeager

[57] ABSTRACT

A bowling glove and wrist support having a palm plate and back plate for engaging, respectively, the front and back portions of the hand, wrist and forearm. An adjustable palm prop overlies a digital end portion of the palm plate to engage a bowling ball. Adjustable strap means are provided on the bowling glove and wrist support for fastening the glove to different sizes and shapes of hands wrists and forearms.

17 Claims, 8 Drawing Figures

BOWLER'S GLOVE AND WRIST SUPPORT

Matter enclosed in heavy brackets [ ] appears in the original patent but forms no part of this reissue specification; matter printed in italics indicates the additions made by reissue.

BACKGROUND OF THE INVENTION

The sport of bowling has experienced substantial improvements during the last few decades and has become one of the most popular indoor sports. For example, electro-mechanical equipment such as automatic pin setters, ball returns and electronic scoreboards have been developed and attention has also been directed to improving a participant's performance. An essential factor in improving a person's bowling game is developing a controlled delivery of the bowling ball. The delivery or release is controlled by the position and movement of various parts of the body with particular focus on the relative position of the hand, wrist and forearm.

As the ball is released, various motions are imparted to the ball which define its path of travel. A first component results from the planar motion defined by the swing of the arm, wrist, hand and ball toward the bowling pins. A second component results from a spinning motion imparted to the ball as it is released from the hand. After the ball is released, an initial sliding motion and rotational motion are imparted to the ball. After the sliding motion has been reduced by friction, only the rotational motion imparts a directional character to the ball. When the rotational directions resulting from the first component (a planar motion defined by the swing of the arm, hand, ball, etc.) and second component (a spinning motion imparted to the ball as it is released) do not coincide, the ball travels in a curved path. In attempting to regulate the degree of curvature, various types of bowling delivery have been developed in which the hand is positioned at different relative positions with respect to the ball as it is released. However, regardless of the type of delivery chosen, it is important to maintain a proper relationship between the forearm, wrist and hand as the ball is delivered, with particular focus on the tendency of the wrist to turn or twist.

Maintaining a proper relationship between the hand, wrist and forearm is especially difficult in view of the complexity of the muscular and skeletal structure of the human hand and wrist. For example, the wrist is composed of eight carpal bones arranged in two rows of four each. The set of carpal bones is connected to five metacarpal bones, which largely define the palmar region of the hand, and to the bones of the forearm, which include the ulna and the radius. The radius is attached to the thumb side or thenar side of the wrist and the ulna is attached to the "little finger" side or hypothenar side of the wrist, with the lower end of the ulna partially defined by a projection designated the styloid process, which is clearly visible at the base of the wrist on the back or posterior side of the forearm. Connected to the five metacarpal bones of the hand are the phalanges which define the four fingers, each including a distal, middle and proximate phalanx, and the thumb, which includes a distal and proximate phalanx. The bones of the hand are connected together with various ligaments, muscles and tendons through which complicated patterns of nerves and blood vessels are located. Therefore, for a person to develop a consistent delivery it is necessary to maintain the various forearm, hand and wrist bones in a proper controlled relationship with respect to each other and to the bowling ball. The muscles, ligaments and tendons are the tissues which control this functional relationship.

The gripping and releasing of the bowling ball, or relative movement of the fingers and thumb, is also important for proper control of the bowling ball. The movements of the fingers (flexion and extension, abduction and adduction) are well known. However, because the thumb has its palmar or flexor surface, in the resting position, at right angles to the palmar surface of the remainder of the hand, its movement planes are generally at right angles to those of the fingers. Thus, flexion of the thumb is bending it across the palm of the hand towards the ulna, extension is a movement in the opposite direction, abduction is moving the thumb away from the index perpendicular to the palmar plane and adduction is returning it towards the palmar plane. The thumb movement of opposition, characteristic of the grasping of objects such as a bowling ball, is a combination of flexion, internal rotation and adduction that brings the palmar surface of the thumb in contact with the palmar surfaces of the fingers. Reposition, the movement away from opposition, would be characteristic of releasing a grip on an object and would involve a combination of abduction, extension and external rotation of the thumb. The rounded contour formed by the muscles of the thumb on the palmar surface is the thenar eminence. For a proper delivery and release of the bowling ball it is necessary that the movement of these muscles, which help to control the movement of the thumb, should not be restricted. The muscular contour formed by the little-finger muscles on the ulnar side of the palmar surface is the hypothenar eminence. The central palmar compartment located between the thenar and hypothenar compartments is often designated the palmar arch. The various types of bowling deliveries and grips, such as conventional, semi-finger-tip, and finger-tip, would involve relative movements of these palmar regions.

Another factor which affects the degree of consistency or control of the delivery is that the bowling ball causes the various muscles, tendons and tissues to be stressed differentially which causes some of them to become fatigued more easily than others.

Various devices have been developed in recent years which attempt to control the relative degree of movement of the hand, wrist and forearm.

Recent patents have been issued which attempt to provide support and control of the bowling ball by combining the features of a palm prop and an insert which covers various portions of the hand and wrist. For example, patents issued to C. Fowler (U.S. Pat. No. 3,564,613), R. Krzewinski (U.S. Pat. No. 3,704,994), Y. Hashimoto (U.S. Pat. No. 3,790,168) and J. Andolino (3,728,738) disclose bowling gloves which incorporate a palm prop and a stiffener insert for the back of the hand.

The present invention relates to a bowling glove which combines the features of an adjustable palm prop with an underlying support plate which is contoured to fit portions of the forearm, wrist and palmar regions of the hand. The palm plate accomplishes the desired results of providing a stable relationship between the forearm, wrist and hand and a support for the palm prop which rests on a distal end of said plate. Another feature of the invention is a back plate which is contoured to support the back of the forearm, wrist and hand. In accomplishing this result, the back plate is designed to avoid contact with various parts of hand, wrist and forearm, such as the styloid process of the ulna. A further feature of the invention is the incorporation of positionable fastening means which allows the glove to fit different relative sizes and shapes of forearms, wrists and hands.

Accordingly, an object of the present invention is to provide a bowling glove and wrist support which will help to control the relative relationship between the forearm, wrist and hand while bowling.

Another object of the present invention is to provide a device which will help stabilize the palmar arch region of the hand while not interfering with the movements of the muscles and tendons of the thenar and/or the hypothenar regions of the hand.

A further object of the present invention is to provide a bowling glove and wrist support with a firm but yeildably resilient palm prop disposed in overlying relation to the palm plate which will help to support the bowling ball and to distribute the stresses applied to the forearm, wrist and hand while bowling.

Still another object of the present invention is to provide a bowling glove and wrist support with a back plate to act in cooperation with a palm support and a prop carried in overlying relation to the palm support, wherein such supports will help the bowler achieve a more controlled delivery.

Yet another object of the present invention is to provide a bowling glove and wrist support with hand attachable means which will position a palm plate in the palmar arch of the hand and a back plate across the back of the hand and wrist.

A still further object of the present invention is to provide a bowling glove and wristlet, which encircles the wrist and styloid processes of the radius and ulna, with strap means for adapting the device to fit different sizes and shapes of wrists and hands.

BRIEF DESCRIPTION OF THE DRAWINGS

The novel features which are believed to be characteristic of this invention are set forth with particularity in the appended claims: The invention itself, however, both as to its organization and method of operation, together with further objects and advantages thereof, may best be understood by reference to the following description taken in combination with the accompanying drawing in which:

DESCRIPTION OF THE INVENTION

Figure 1:
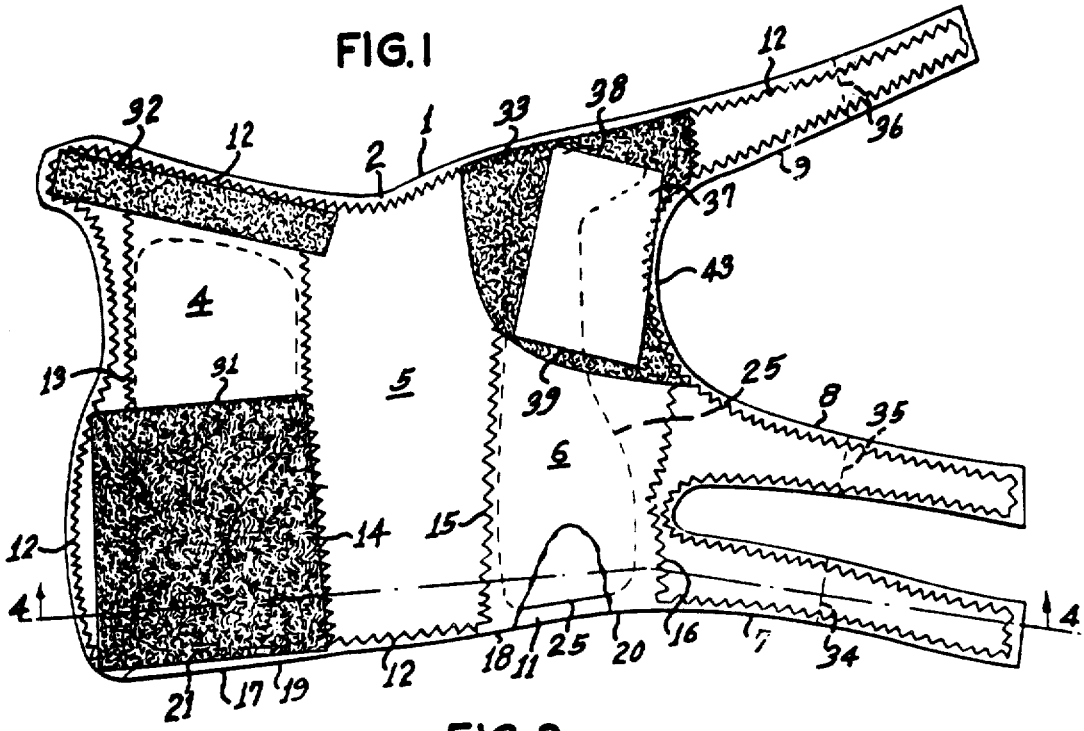
FIG. 1 is a plan view showing a right hand glove according to the invention.

In the illustrated embodiment of the invention, FIG. 1 shows the outer face 2 of the bowling glove and wrist support 1 (hereinafter referred to as the glove). The glove consists of a back portion 4, whose right edge is joined to a side portion 5, wherein the right edge of the side portion is attached to a palm portion 6. Attached to the right edge of the palm portion 6 are strap means including a first wrist strap 7, a second wrist strap 8 and a hand strap 9.

Figure 4:
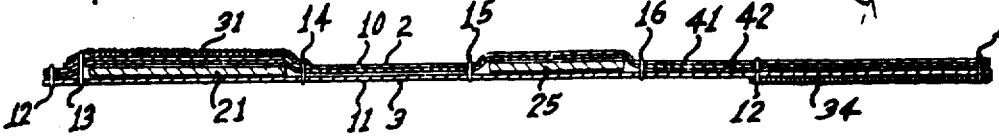
FIG. 4 is a sectional view taken along line 4—4 of FIG. 1.

The glove, as seen in FIG. 4, is preferably composed of a first layer 10, of which the exposed surface constitutes the outer face 2 of the glove, and a second layer 11, of which the exposed surface constitutes the inner face 3, wherein said layers are of leather or leather-like synthetic plastic material that are sewn together. Perimeter stitching 12, denoted by zig-zag lines, is shown extending along the left, top and right edges and partially along the bottom edge of the glove illustrated in FIG. 1. Interior stitching, represented by zig-zag stitches 13, 14, 15 and 16 extends at spaced intervals from the bottom to the top of the glove shown in FIG. 1. The stitching 14 may be visualized as a border between the back portion 4 and the side portion 5. Similarly, the stitching 15 may be visualized as a border between the side portion 5 and the palm portion 6. The stitching also defines a back pocket 17 and a palm pocket 18, the pockets being adapted to receive insert plates. The back pocket 17 is defined in the back portion 4 of the glove by stitching 12, 13 and 14 with a back pocket access slit 19 formed along the unstitched bottom edge portion of the glove shown in FIG. 1. The palm pocket 18 is defined in the palm portion 6 of the glove by stitching 12, 15 and 16 with a palm pocket access slit 20 formed along the unstitched bottom edge portion of the glove illustrated in FIG. 1.

Figure 3:
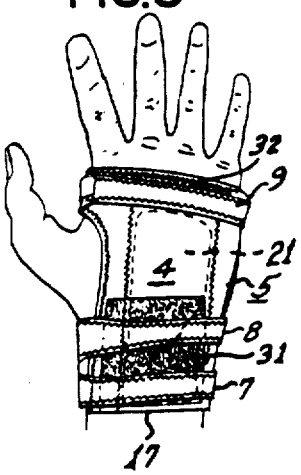
FIG. 3 is a back plan view of the glove of FIG. 1 wrapped around the back of the right hand.
Figure 6:
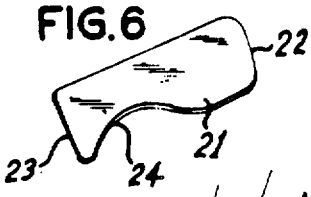
FIG. 6 is a perspective view of the back plate insert.

A back plate insert 21, as shown in FIG. 6 and in broken lines in FIG. 1 and FIG. 3, is adapted to be inserted into the back pocket 17. The back plate is made of a stiff material, preferably of a malleable material such as aluminum. It was found that an aluminum plate having a thickness of about one-sixteenth of an inch is bendable by hand with difficulty yet forms a rigid brace when the glove is in use. The back plate is relatively flat and includes a back plate first end portion 22, a back plate second end portion 23 and an inwardly curved arcuate portion 24 designed to receive the protruding portion of the wristbone or styloid process of the ulna.

Figure 2:
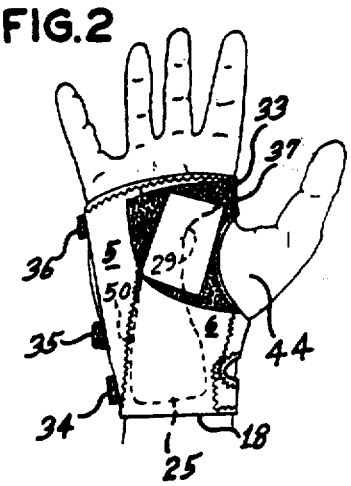
FIG. 2 is a front plan view of the glove of FIG. 1 wrapped around the palm of the right hand.
Figure 5:
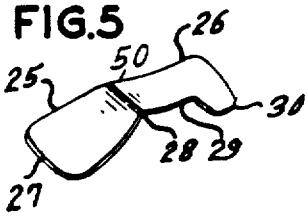
FIG. 5 is a perspective view of the palm plate insert.

A palm plate insert 25, as shown in FIG. 5 and in broken lines in FIG. 1 and FIG. 2, is adapted to be inserted into the palm pocket 18. The palm plate is also made of a material which is rigid in use but which is preferably a malleable material such as aluminum with a thickness range similar to but not necessarily coinciding with the thickness of the back plate. Although the palm plate forms a rigid brace when applied to the hand, it is capable of being bent or otherwise formed to fit the particular hand, wrist and forearm contour of the wearer before it is worn. The palm plate has an arched profile when viewed from one direction and includes a palm plate first end portion 26 and a palm plate second end portion 27, both of which merge at an intermediate bent or curved portion 28. As shown in FIG. 2, the second end portion 27 is adapted to extend across the inner surface of the wrist, spanning the wrist joint, with the width of said portion decreasing as it extends toward the bent portion. The bent portion 28 is adapted to overlie the base of the palmar surface of the hand and the bent portion merges into the palm plate first end portion 26, which is adapted to be disposed in the palmar arch region of the wearer's hand. The front plate thus follows and is formed to fit against the wrist, the base of the palm and upwardly along the palm to the upper terminus of the plate. The first end portion includes a thenar edge 29 which is adapted to partially receive the rounded contour formed by the muscles of the thumb, which is known as the thenar eminence 44, as partially seen in FIG. 2. The other edge 50 of palm plate 25 is generally aligned with the side edge of the middle finger which is adjacent the fourth (including the thumb as the first) finger. A first end projection 30 may be formed on the first end portion 26 to provide a greater amount of support for the hand and a larger support area for an overlying palm prop.

Various connecting elements are sewn or otherwise secured to the glove. A wrist patch 31, hand patch 32 and prop patch 33 are secured to the outer face 2 of the glove, as shown in FIG. 1. Secured to the inner face 3 of the glove, illustrated by broken lines in FIG. 1 and partially exposed in FIG. 2, are a first wrist patch 34 and second wrist patch 35 sewn to the wrist straps 7 and 8 respectively, and a hand strap patch 36 sewn to hand strap 9. Preferably, the first wrist patch 34, second wrist patch 35 and hand strap patch 36 are of a hook type fabric. The wrist patch 31, hand patch 32 and prop patch 33 are preferably of a loop pile fabric, which is designed to mesh with the hook type fabric such as is sold under the trademark "Velcro". The area of the wrist patch 31 is larger than the combined areas of the first wrist patch 34 and second wrist patch 35 to permit adjustable angular positions of attachment for the straps 7 and 8.

Figure 7:
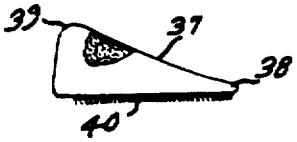
FIG. 7 is a side view of the palm prop of FIG. 1.

A wedge-shaped prop 37 is carried by the glove in a position which overlies the palm plate first end portion 26. The prop 37, as illustrated in FIGS. 1, 2 and 7, is made with a firm but at least somewhat resilient core, such as polyurethane, covered with leather or flexible plastic material. Having a low edge portion 38 and a high edge portion 39, the prop is designed to rest on the prop patch 33, as illustrated in FIG. 1. A prop strip 40 of a hook type material is attached to the lower surface of the prop for attaching said prop in adjustable positions on the prop patch. The prop should yield sufficiently to conform at least in part to the spherical contour of the ball but it is sufficiently firm to retain its general triangular or wedge shape when in use and thus to provide a substantially unyielding base or prop between the palm plate and ball during delivery.

Referring specifically to FIG. 4, the glove comprises a first layer 10 composed of an outer face material 41 of leather or similar material and a lining material 42 of a soft leather or fabric. The second layer 11 which lies against the skin of the wearer is preferably of leather which is comfortable and resistant to stiffening from the sweat of the hand. The two layers are sewn together by stitching 12, 13, 14, 15 and 16. The back plate 21 and palm plate 25 are disposed between the first and second layers.

In use, the back portion 4 extends across the back of the hand, as shown in FIG. 3, the side portion 5 extends around the edge of the hand adjacent the little finger and the palm portion 6 extends across the palm of the hand, as shown in FIG. 2.

The pocket 18 thus comprises a means for retaining the palm plate in position on the hand in the orientation shown in FIGS. 1 and 2. The palm plate 25, which is adaptable to fit a particular hand, wrist and forearm contour, is inserted into the palm pocket 18. When the hand-attachable means, which comprises the glove, is applied to the hand, it is preferable that the first end portion 26 is disposed in the palmar arch region of a wearer between the thenar eminence muscles and the knuckles of the fingers. While the location of the first end portion is shown as being between the thenar eminence and the palm knuckle of the middle finger, it has been found that the palm plate may terminate somewhat short of that location but the plate should extend to within a short distance of the middle finger knuckle of the palm, and, specifically it may terminate between the head line and the heart line of the palm. It will be seen that the edge 29 of the palm plate approximately follows along the life line of the palm, with the plate extending across the life line slightly into the thenar eminence. Also edge 50 of the palm plate 25 extends generally in alignment with the middle finger side edge closest to the fourth finger.

The glove or wrap-on assembly also includes a means for retaining the back plate, and, as shown, such means includes a back pocket 17. With the back plate so retained by the glove and its pocket, the first end portion 22 of the plate extends along the back of the hand and the second end portion 23 extends across the back of the wrist, spanning the wrist joint and terminating on the lower forearm. The position of the back plate 21 in the pocket 17 is adjustable so that styloid process of the ulna or wristbone is received in the arcuate portion 24. The first end portion 22, as shown in FIG. 3, provides a firm support for the middle of the back of the hand, but, preferably, does not cover the knuckles. This provides a firm support for the back of the hand wrist and forearm while it does not restrict the movement of the thumb and fingers.

The unique combination of straps 7, 8 and 9 and patches 31 and 32 permits the adjustable glove to fit different sizes and shapes of hands and wrists. The wrist straps 7 and 8, which are designed to interlock with wrist patch 31, are attachable at various angular positions on the patch 31. When the glove is applied to the hand, the base of the hand strap extends between the index finger and thumb, as illustrated in FIGS. 2 and 3, and a thumb opening 43 is designed to curve around the base of the thumb.

Figure 8:
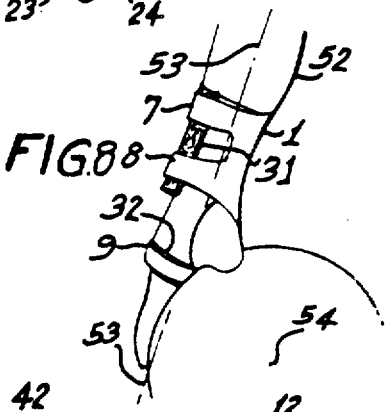
*FIG. 8 is a generally front view of a user's hand with the glove of FIG. 1 in position showing the hand, forearm and bowling ball in their positions with respect to each other.*

*FIG. 8 illustrates the glove 1 being worn on the user's hand 51 and forearm 52 having an elongated axis 53 disposed rearwardly of the center 54 of bowling ball 55. Accordingly, the back of the hand, being restricted by the substantially flat back plate 21, shown in FIG. 6, maintains the back of the hand in substantial alignment with the back of the forearm in the same manner as the hand may loosely dangle from the arm when the upper arm and forearm are at the side of a user.*

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a bowling glove and wrist support, a palm plate having a first end portion and a second end portion, hand-attachable means carrying said plate for disposing said plate with its said first end portion [in and bridging] *extending across* the palmar arch of a wearer and terminating adjacently below the palm knuckle of the middle finger [and with its] *between the head line and the heart line of the palm,* said second end portion *of said*

*plate extending* across the inner surface of the wrist spanning the wrist joint, and a prop carried by said means in a position overlying said first end portion *for providing said prop with support by said plate.*

2. A bowling glove and wrist support according to claim 1, [wherein] *further comprising* adjustable connecting means [are provided] on said hand-attachable means and on said prop for attaching said prop in adjustable [position] *positions.*

3. A bowling glove and wrist support according to claim 1, including a back plate carried by said hand-attachable means extending along the back of the hand and the back of the wrist and spanning the wrist joint.

4. A bowling glove and wrist support according to claim 1, wherein said first end portion terminates between the thenar eminence and adjacently below the palm knuckle of the middle finger.

5. The combination according to claim 1 wherein said plate includes a side edge adjacent the thumb of a wearer and another side edge spaced therefrom, said other side edge being in general alignment with the side of the middle finger of a wearer adjacent the fourth finger.

6. A unitary bowling glove and wristlet for covering the palm and back of the hand and encircling the wrist and the styloid processes of the radius and ulna of a wearer, comprising a palm plate having a first end portion and a second end portion, [a] *an elongated* back plate having a first end portion and a second end portion *and being generally flat between its said end portions,* said glove and wristlet including means for retaining said palm plate with its first end portion [in] *extending across* the palmar arch of a wearer *and* terminating adjacent the palm knuckle of the middle finger and with its second end portion disposed across the inner surface of the wrist spanning the wrist joint, said plate having a side edge [generally avoiding] *partially overlapping* the thenar eminence *adjacent the wrist joint* and another side edge generally aligned with the side of the middle finger of a wearer adjacent the fourth finger *thereby supporting the overlapped portion of the thenar eminence and a partially overlapped heel portion of the palm adjacent the thenar eminence,* and means for retaining said back plate with its first end portion along the back of the hand and its second end portion on the back of the wrist spanning the wrist joint *to maintain the back of the hand in substantial alignment with the back of the forearm.*

7. The combination according to claim 6, wherein said glove and wristlet is a wrap-on assembly having opposite side edges and having strap means extending between said edges.

8. The combination according to claim 7, wherein said glove and wristlet assembly comprises a patch of loop pile fabric disposed adjacent one of said edges and at least two straps extending from said other edge and each provided with a hook pile fabric patch to mesh with said loop pile fabric, the area of said first patch being larger than the combined areas of said hook pile patches to permit adjustable angular positions of attachment of said straps.

9. The combination according to claim 6, wherein said first end portion terminates between the thenar eminence and adjacently below the palm knuckle of the middle finger.

10. The combination according to claim 6 further comprising a prop carried by said glove in a position to overlie said palm plate first end portion.

11. In a bowling glove and wrist support, a palm plate having a first end portion, a second end portion and an intermediate portion extending therebetween, attachment means carrying said plate for disposing said plate with said first end portion [in] *extending across* the palmar arch and aligned toward and terminating adjacently short of the palm knuckle of the middle finger, with said intermediate portion extending across the base of the palm partially over the thenar eminence *and partially over the heel portion adjacent thereto* and with said second end portion extending across the inner surface of and spanning the wrist joint of a wearer, said plate being formed to fit against the wrist, the base of the palm and upwardly along the palm of the palmar arch of the wearer, and a prop attached to said attachment means disposed in overlying relation to said first end portion *and being supported by said first end portion of said plate.*

12. A bowling glove and wrist support according to claim 11, wherein said palm plate is made of a rigid malleable metal.

13. The combination according to claim 11 and a back plate carried by said [means for disposition thereby] *glove and disposed* along the back of the hand and the back of the wrist and spanning the wrist joint of the wearer.

14. A bowling glove and wrist support according to claim 13, wherein said plates are made of a rigid malleable metal.

*15. A bowling glove and wrist support according to claim 13 wherein said back plate is generally flat to maintain the back of the hand in substantial alignment with the back of the forearm.*

*16. A bowling glove and wrist support according to claim 3 wherein said back plate is elongated and generally flat between its end portions, said back plate maintaining the back of the hand in substantial alignment with the forearm so that the center of a bowling ball will be offset inwardly away from the palm and offset from the elongated axis of the forearm.*

*17. A bowling glove and wrist support according to claim 6 wherein said palm plate and back plate restricting the movement of the wrist and positioning the center of a bowling ball offset inwardly away from the palm and offset from the elongated axis of the forearm.*

* * * * *